(12) United States Patent
Grabau et al.

(10) Patent No.: US 7,994,652 B2
(45) Date of Patent: Aug. 9, 2011

(54) WIND TURBINE WITH FLOW SURFACES

(75) Inventors: Peter Grabau, Kolding (DK); Tommy Sorensen, Lemming (DK)

(73) Assignee: LM Glasfiber A/S, Lunderskov (DK)

(*) Notice: Subject to any disclaimer, the term of this patent is extended or adjusted under 35 U.S.C. 154(b) by 474 days.

(21) Appl. No.: 12/086,317

(22) PCT Filed: Dec. 18, 2006

(86) PCT No.: PCT/DK2006/000720
§ 371 (c)(1), (2), (4) Date: Jun. 10, 2008

(87) PCT Pub. No.: WO2007/068256
PCT Pub. Date: Jun. 21, 2007

(65) Prior Publication Data
US 2009/0295164 A1    Dec. 3, 2009

(30) Foreign Application Priority Data
Dec. 16, 2005    (DK) .................................. 2005 01780

(51) Int. Cl.
*F03D 1/04* (2006.01)
(52) U.S. Cl. ........................................... 290/55; 415/4.2
(58) Field of Classification Search .................... 290/55, 290/44, 43, 54; 415/4.2, 2.1, 4.5, 4.3; 416/1, 416/7, 132 B; 60/398
See application file for complete search history.

(56) References Cited

U.S. PATENT DOCUMENTS

| | | | |
|---|---|---|---|
| 4,017,204 A | 4/1977 | Sellman | |
| 4,182,594 A | 1/1980 | Harper et al. | |
| 4,279,569 A * | 7/1981 | Harloff | 415/53.3 |
| 4,324,985 A * | 4/1982 | Oman | 290/55 |
| 4,600,360 A * | 7/1986 | Quarterman | 415/148 |
| 5,419,683 A * | 5/1995 | Peace | 416/227 A |
| 5,982,046 A * | 11/1999 | Minh | 290/55 |
| 6,655,907 B2 * | 12/2003 | Brock et al. | 415/4.2 |
| 7,256,512 B1 * | 8/2007 | Marquiss | 290/55 |
| 7,484,363 B2 * | 2/2009 | Reidy et al. | 60/398 |
| 2007/0147998 A1 * | 6/2007 | Jang | 416/132 B |
| 2009/0134623 A1 * | 5/2009 | Krouse | 290/43 |

FOREIGN PATENT DOCUMENTS

| WO | WO 02/068817 | 9/2002 |
|---|---|---|
| WO | WO 2004/011799 | 2/2004 |

* cited by examiner

*Primary Examiner* — Michael C Zarroli
(74) *Attorney, Agent, or Firm* — Day Pitney LLP

(57) ABSTRACT

The present invention relates to a method of increasing the output of a wind turbine, wherein one or more flow surfaces are placed at a wind turbine. At lower wind speeds, the flow surfaces are set to guide the wind up towards and/or out from the rotor of the wind turbine and hence use the venturi effect in the rotor to advantage. At higher wind speeds, the flow surfaces are completely or partially taken out of the flow of the wind. Moreover, the flow surfaces can be adjusted around the wind turbine based on measurements of the speed of the wind and direction of the wind and/or the power signal of the wind turbine. The invention further relates to a system comprising one or more flow surfaces and means for adjusting same to the effect that the output of a wind turbine can be maximized by using the venturi effect to advantage as described above.

15 Claims, 5 Drawing Sheets

WIND TURBINE WITH FLOW SURFACES

The invention relates to a method of increasing the output of a wind turbine comprising to arrange at least one flow surface by a wind turbine. The invention further relates to a system for increasing the output of a wind turbine and a wind turbine featuring such system.

BACKGROUND

When designing and constructing wind turbines it is a significant parameter to the output of the plant, that the energy in the wind is utilized maximally. To this end wind turbines have been provided with various devices for, on the one hand, directing the wind to the rotor of the turbine and, on the other hand, increasing the speed of the wind in front of and behind the rotor by using the so-called venturi effect to advantage. The venturi effect describes the effect that occurs in a flow through a pipe with a narrowed portion, where the flow is accelerated as the cross-section area decreases. Thus, the venturi effect comprises a speed-up effect in front of the narrowed portion and a diffuser effect after where a subatmospheric pressure is generated.

For instance from JP 2004 052721, a wind turbine is known which is equipped with a diffuser or a funnel around the rotor. The shape of the diffuser causes the speed of the wind to increase and hence the effect that can be drawn out of the wind by the diffuser. The principle works well and the output of the turbine can be increased considerably. However, the dimensions of modern wind turbines are now so large with rotor diameters of more than 100 m that a correspondingly large diffuser matching them cannot be realised due to, on the one hand, the increased mass to be carried by the wind turbine tower and, on the other, due to the loads on the funnel becoming, in case of high wind speeds such as eg stormy weather, so powerful that the construction cannot last irrespective of whether the turbine is otherwise turned out of the wind. The latter aspect also applies to smaller wind turbines with smaller rotor diameters.

Moreover, it is known (eg from US 2004/0113431 and CA 2 439 420) to arrange a wind turbine with vertical axis of rotation within a tower structure with vertical shields or shudders that are arranged all the way around the rotor. Here the shields ensure that the turbine is able to operate at all wind directions and, moreover, that they are able to shut off completely or reduce the wind considerably in hard winds and hence serve to protect the turbine. In order to function, the shields or towers have a height that reaches past the rotor and it follows that, likewise, they can be realised only in case of relatively small wind turbines, since, on the one hand, they will make a large wind turbine take up much space in the landscape and, on the other, they will not be able to cope with the loads occurring as a result of high wind speeds.

Moreover, over time it has been attempted to maximize the output of wind turbines by placing them appropriately in the landscape or even by adapting the surrounding landscape to the turbine. Thus, it is known to arrange a wind turbine on a hill whose shape is cultivated and adapted especially to be able to increase the wind speed towards the turbine maximally. However, such cultivation is often far from possible or desirable from the point of view of the land owner.

WO 02/068817 describes placing an artificial mound adjacent a wind turbine, this mound is a static element and cannot be moved during higher wind speeds.

WO 2004/011799 describes positioning of static passive profiles in front of the wind turbine.

In both documents a compromise has to be made to avoid extreme loads on the wind turbine that can damage the wind turbine during extreme winds.

OBJECT AND DESCRIPTION OF THE INVENTION

It is the object of the invention to provide a method of increasing the output of a wind turbine by utilizing the so-called venturi effect to advantage, but in such a manner that the above-mentioned problems of extreme loads on the wind turbine are obviated.

Thus, the present invention relates to a method of increasing the output of a wind turbine comprising placement of at least one flow surface such that, at lower wind speeds, the flow surface is adjusted to create a venturi effect by guiding the wind in towards and/or out of the rotor of the wind turbine, and such that, at higher wind speeds, the flow surface is at least partially taken out of the wind flow.

Hereby the advantageous aspect is accomplished that the wind flow-through through the rotor of the wind turbine is increased considerably and thereby also its power production and output. This is particularly advantageous in case of lower wind speeds, where a wind turbine is designed to maximise its power output. Simultaneously it is accomplished by the method according to the invention that the flow surfaces can, at higher wind rates, be turned out of the wind or otherwise be removed from the flow, whereby the flow surfaces will not increase the wind flow-through and hence not the wind loads within the wind speed range, where it is attempted to minimise or limit the loads on a wind turbine. Likewise it is also avoided hereby that the high wind loads become critical to the construction of the flow surfaces, simultaneously with it being avoided that the flow surfaces are to be dimensioned to such large loads. The latter thus entails considerable savings in material for the flow surfaces. It is a further considerable advantage of the method according to the invention that it is independent of the wind turbine. Thus, the flow surfaces can be placed in connection with all wind turbines, irrespective of type, year, foundation type, etc., and hence it does not contribute to the weight of the wind turbine or influences its balancing or the like. Therefore one or more flow surfaces can thus also be mounted or mounted subsequently in case of a wind turbine without an ensuing need for mounting accessory equipment thereon.

According to embodiments of the invention, the at least one flow surface can be placed at the wind turbine and/or a second wind turbine placed in front of the first one. The latter is advantageous in connection with two or more wind turbines placed in the same area such as eg in case of wind farms. In case of wind directions extending more or less along a row of wind turbines, the wake of the first turbine will influence the efficiency of the next turbine. Placement of a flow surface at the one wind turbine leading the wind towards the rotor of the next wind turbine enables an increase in its power output. This may be advantageous in particular as far as wind turbines placed at sea are concerned.

The invention further relates to a method according to the above for increasing the output of a wind turbine, wherein the at least one flow surface is taken at least partially out of the flow of the wind in that the flow surface is laid down along the ground or in that it is folded or rolled up. As also mentioned above, this is advantageous, in that the flow surfaces are, in a simple manner, able to resist even stormy weather or harsher wind conditions and, likewise, it is ensured that they will not increase the wind loads on the wind turbine either, which would have been extremely undesirable in certain situations.

Also, the invention describes a simple operation for causing the shields to leave the wind, which can be designed and configured in a simple manner without complex or expensive special equipment.

One method relates to a method of increasing the output of a wind turbine, further comprising to measure the direction of the wind and to place the at least one flow surface relative to the wind turbine as a function of the direction of the wind and/or to measure the speed of the wind and to adjust the flow surface as a function thereof. Hereby the flow surfaces can be adjusted and positioned optimally in relation to both the wind and the wind turbine, but still independently of the wind turbine. This is advantageous in that, therefore, a coupling between the control and regulation of the wind turbine and the flow surfaces hereby becomes redundant, which would otherwise have made the method considerably more cumbersome and added to its costs.

According to a further embodiment of the invention, a power signal is received from the wind turbine to set the at least one flow surface as a function thereof. Thereby the information from the control system of the wind turbine can be used to advantage for the adjustment of the flow surfaces, and an additional air flow meter in connection with the control of the flow surfaces can be avoided.

The present invention also relates to a system of increasing the output of a wind turbine comprising at least one flow surface placed such that the flow surface will, at lower wind speeds, create a venturi effect by guiding the wind in towards and/or out from the rotor of the wind turbine, and said system further comprising means for adjusting the flow surface such that, at elevated wind speeds, the flow surface will be taken at least partially out of the flow. Hereby advantages as given above for the methods according to the invention are accomplished.

According to further embodiments the at least one flow surface is placed by the wind turbine and/or at a second wind turbine located in front of the first one.

One embodiment of the invention describes a system according to the above, wherein the means for setting the at least one flow surface or the flow surfaces comprise at least one hydraulic motor or electro-motor. Hereby the setting of the flow surfaces can be regulated in a simple manner.

According to a further embodiment the system comprises a wind speed indicator or a wind direction meter. The advantages of this are as mentioned above.

According to one embodiment the system comprises at least one flow surface which is mounted to rotate rotatable about the wind turbine, eg by being mounted on rails, pontoons or ships. By such device it is enabled that the flow surfaces can be set optimally relative to the wind turbine no matter the current direction of the wind.

According to a further embodiment the system comprises that the at least one flow surface is mounted on or at the ground and/or the water surface and is of a height corresponding to the distance there from to the lowermost part of the rotor of the wind turbine or less. This is advantageous in that, in that case, the flow surfaces do not increase the weight of the wind turbine. Simultaneously their limited size means that the shields are not exposed to the same powerful loads in harsh weather conditions and therefore they can be made with smaller dimensions. Simultaneously they will give a less massive visual impression than would be the case if the shields were to be of a height comparable to the height of the wind turbine.

According to yet an embodiment the system comprises that the at least one flow surface is made of a composite plastics material, such as eg glass fibre or carbon fibre or is made of canvas. This is advantageous in describing relatively inexpensive materials, whereby the production costs can be minimised, as well as very light materials, whereby the setting using less power be changed or maintained.

According to a further embodiment, the system comprises that the system is coupled to the control system of the wind turbine for receiving signals for setting of the at least one flow surface. Hereby the power signals of the wind turbine, which provides information on ia the average wind speed in the rotor plane, are used to advantage to set the flow surfaces optimally whereby a separate air flow meter on the system is rendered superfluous.

The invention according to the present application further relates to a wind turbine comprising a system for increasing the output of a wind turbine as described by one or more of the above-mentioned elements. The advantages of this are as described above.

Finally, the present invention also relates to use of a method for increasing the output of a wind turbine as described above.

BRIEF DESCRIPTION OF DRAWINGS

In the following the invention will be described with reference to the figures, wherein.

DESCRIPTION OF EMBODIMENTS

Figure 1:
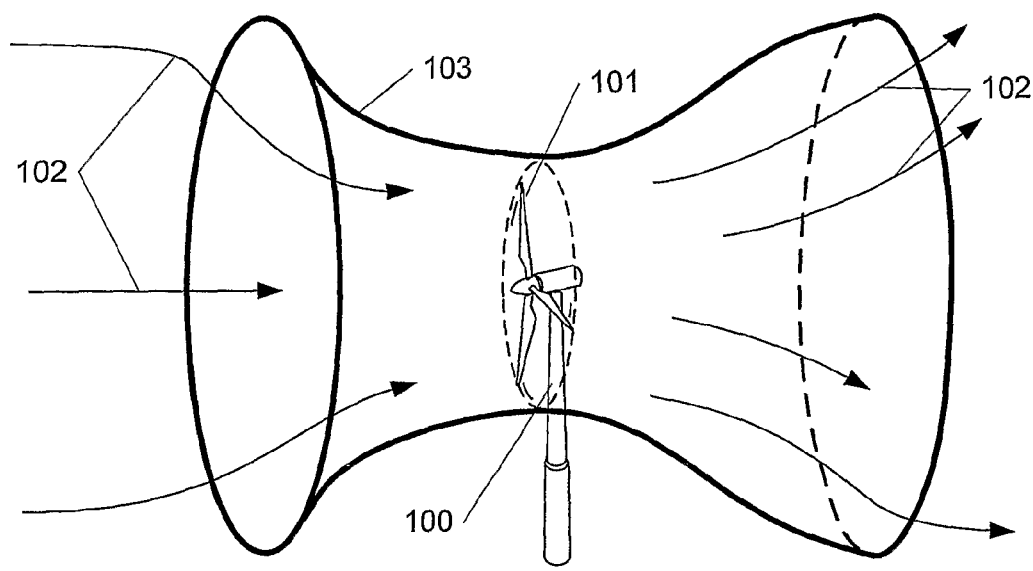
FIG. 1 illustrates how the venturi effect can be used to advantage to increase the speed of the wind through the rotor of a wind turbine.

FIG. 1 shows how the flow conditions can be changed around a wind turbine 100 by utilizing the venturi effect to advantage, whereby the speed of the wind through the rotor 101 of the wind turbine can be increased, and thereby the output can be increased correspondingly. The wind is conveyed from a larger area towards the rotor 101 and out again behind the rotor as outlined by arrows 102. If the rotor 101 of the wind turbine 101 is arranged inside a narrowed tube 103 the shape of the tube entails that the flow-through rate increases as the pressure drops as described by the Bernoulli equation.

Figure 2:
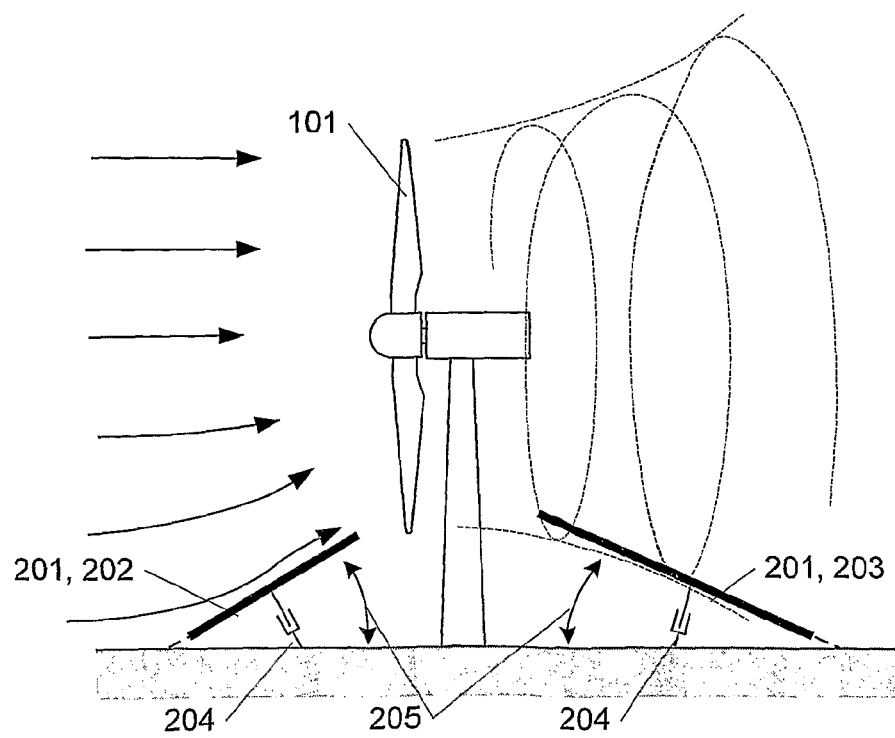
FIG. 2 shows flow surfaces arranged in front of and behind a wind turbine according to the invention.
Figure 3:
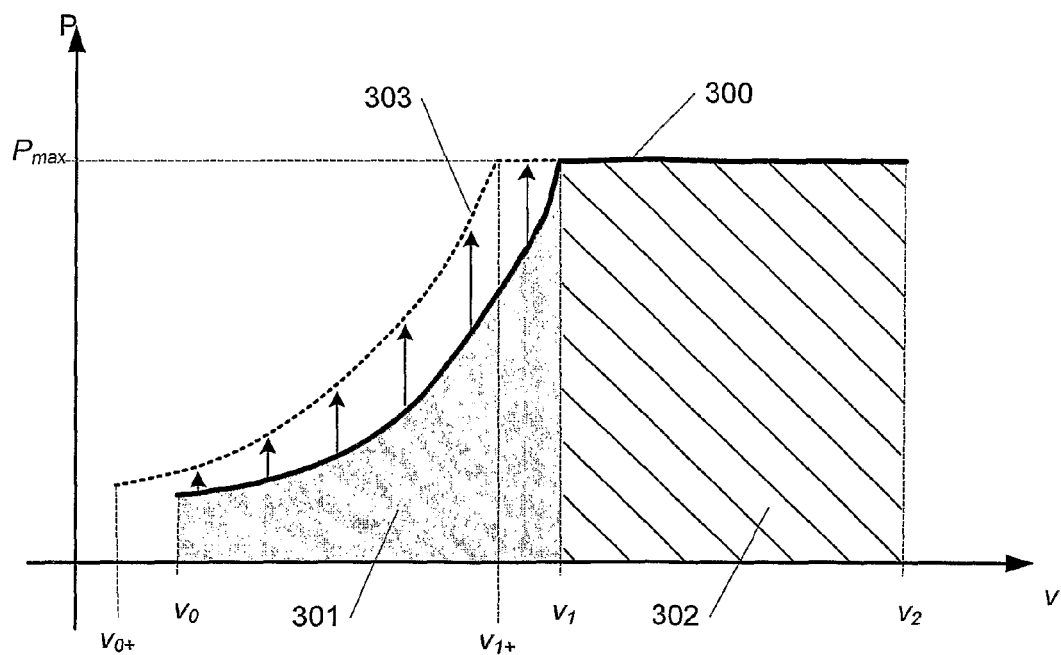
FIG. 3 shows a typical power curve for a wind turbine and how it can be optimised by use of flow surfaces according to the invention.

As described in the introductory part, it is not realisable to mount funnels or diffusers on today's wind turbines, as outlined in FIG. 1, first of all because of the dimensions and the ensuing loads on the constructions even when moderate wind force conditions prevail. However, the wind flow-through speed and hence the output of the wind turbine can also be increased considerably by arranging shields or flow surfaces 201 on the ground (or the water) in front of and after the rotor and oriented such that they guide the flow of wind up towards or out of the rotor and hence create a venturi effect. This is shown in FIG. 2, where a wind turbine 100 is shown, seen from the side, with two flow surfaces 201 arranged at a distance in front of and behind, respectively, the wind turbine 100. The foremost shield or plate 202 is arranged as a kind of artificial hill guiding and directing the flow up towards the rotor 101, whereby the speed of the wind is increased. The shield is lifted a small distance from the surface at the front and allows a minor part of the flow to pass underneath the shield in order to thereby avoid that dirt and dust is whirled along directly into the rotor. Likewise the rearmost flow surface or plate 203 is arranged to constitute a part of a diffuser and controls the wind out of the rotor to the effect that a subatmospheric pressure is formed behind the rotor 101. This shield, too, is lifted a distance from the surface in order for a portion of the flow to travel underneath the shield. Such increase in the wind flow-through, however, is advantageous only in case of low wind speeds where the wind turbine, as will also be discussed in the context of FIG. 3, is dimensioned to maximise the power output and productivity of the plant. Conversely, in case of higher wind speeds, the wind turbine is dimensioned with a view to minimising the wind loads on the turbine, and, at best, the speed-increasing flow surfaces are disadvantageous and, at worst, they may be the indirect cause of damage to the wind turbine in the long run. To avoid this, the flow surfaces are constructed such that they can be laid down in case of elevated wind speeds as illustrated in FIG. 2 by the two hydraulic motors 204 and the arrows 205. Hereby it is also accomplished that the plates need not be dimensioned in accordance with the correspondingly high loads and power influences resulting from high wind speeds. The setting and orientation of the flow surfaces 201 can be regulated and controlled by various methods and devices that are known to a person skilled in the art.

FIG. 3 schematically shows a typical power curve 300 (with the fully drawn line) for a wind turbine. The curve 300 shows the power accomplished P as a function of the wind speed v. The wind turbine starts to produce power at a starting wind at the speed $V_0$ and the power output increases from there in pace with increasing wind speeds until speed $V_1$. In this area 301 the wind turbine is constructed to maximise the power output and productivity of the wind turbine. In case of wind speed $V_1$ the wind turbine outputs the maximal effect $P_{max}$. The magnitude of this speed depends on various factors such as financial factors, including eg the size of the generator and local wind conditions where the wind turbine is to be placed. From the wind speed $V_1$ and until the stopping wind $V_2$ the wind turbine is constructed to output a more or less constant maximal effect $P_{max}$. The additional effect which could actually be recovered in case of the higher wind speeds is usually not exploited since it is not profitable compared, on the one hand, to how often such high wind speeds occur and, on the other, the additional production costs the correspondingly larger wind load would entail in the form of stronger gear, tower, generator, etc. In this area 302, at speeds between $V_1$ and $V_2$, the wind turbine is thus usually constructed to minimise the loads on the wind turbine.

By placing and utilising one or more flow surfaces according to the invention, the wind flow-through speed through the rotor is increased compared to the nominal wind speed. Hereby it is accomplished that the wind turbine can start to produce power already at a correspondingly lower wind speed $V_{0+}$ as shown in FIG. 3 by the dotted curve 303. The output of the wind turbine will, due to the flow surfaces, be increased at the lower wind speeds, and the maximal effect $P_{max}$ will be obtained at a lower wind speed $V_{1+}$. In case of wind speeds more elevated than that, the wind turbine is, as mentioned above, constructed to output a constant maximal effect $P_{max}$ and, in that case, the flow surfaces are here turned out of the wind or laid down as described eg in the context of FIG. 2 in order not to unnecessarily increase the loads on the one hand on the wind turbine and, on the other, on the flow surfaces as such.

Figure 4:
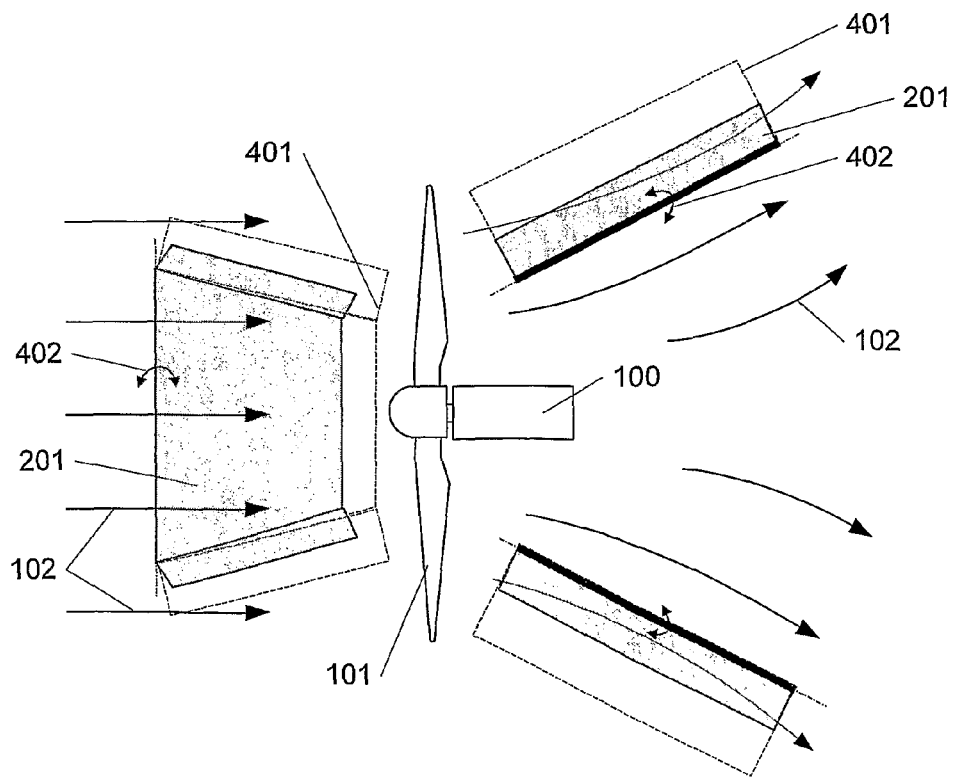
FIGS. 4 and 5 show a further embodiment of the invention with flow surfaces arranged in front of and behind a wind turbine, seen from above and in an inclined view from the front.

FIG. 4 shows a wind turbine 100 with its rotor 101, seen from above. In front of the wind turbine on or near ground level, a flow surface 201 according to the invention is arranged which, like the embodiment shown in FIG. 2, acts as a hill in front of the wind turbine and guides the wind 102 up towards the rotor 101. The flow surface 201 is here combined of several plates angled in relation to each other that combine to form a section of a curved bottom of an imaginary venturi duct with the rotor arranged in the narrowed portion of the duct and contributing to focusing the flow of air and hence accelerating it. Dotted lines 401 mark how the flow surface 201 can be caused to lie down and hence be taken out of the flow 102. In this embodiment the flow surface is tilted about its foremost edge as shown by rotation arrow 402, but of course the plate can be laid down or removed in many other ways obvious to a person skilled in the art.

FIG. 4 also shows how flow surfaces 201 can advantageously be placed behind the wind turbine 100. In the embodiment shown the flow surfaces 201 are mounted such that they form a section of the walls of an imaginary venturi duct around the wind turbine and convey and direct the flow of air out of the rotor 101 as illustrated by arrows 102. Thereby the pressure behind the rotor is reduced and the flow-through speed at the rotor is increased with an ensuing increased power output. It is still an important aspect of the invention that the flow surfaces 201 can be laid down or turned out of the wind when the wind speed exceeds a given magnitude and it is desired to minimise the wind loads on the wind turbine instead. The rearmost flow surfaces 201 can therefore, according to one embodiment, be laid down like the foremost one as outlined by rotation arrows 402 in FIG. 4, but, likewise, they may merely be turned out of the wind. According to one embodiment the system of flow surfaces is connected by means of an wind speed indicator measuring the speed of the wind and, based on this, the position or setting of the flow surfaces is controlled; whether they are to be in the wind and form a venturi effect or to be taken out of the wind.

According to an alternative embodiment of the invention the flow surfaces are made of canvas or the like textile which is kept entirely or partially stretched out by the wind, and are secured in their desired positions by means of stays or the like. In front of the wind turbine, a flow surface can thus be made by means of a parachute-like or kite-like structure which is kept in the wind at a height comparable to the height of the wind turbine. The expanded face hereby constitutes a section of the uppermost part of a venture duct and conveys the wind downwards from above and inwards towards the rotor. In a similar manner, a parachute-like face can be used behind the rotor which is kept partially extended by the wind, forming a hill-like shape corresponding to the rearmost flow surface 203 of FIG. 2.

Figure 5:
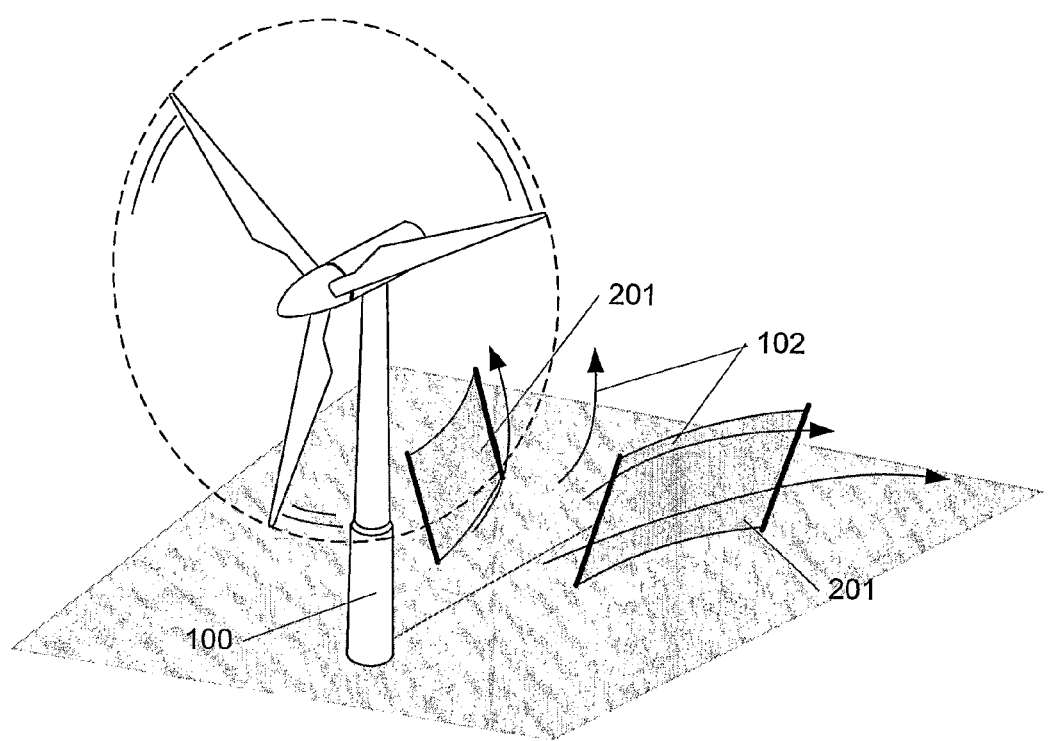

Again in FIG. 5 a possible location of flow surfaces 201 behind a wind turbine is shown, this time seen at an inclined angle from the front. The flow surfaces 201 are here configured as curved plates or shields. It is an advantage of the flow surfaces according to the invention that they can be manufactured as a separate product and arranged around any kind of wind turbine independently of the size thereof, production type, etc. Advantageously the shields can be arranged on or founded on the ground (or water surface where wind turbines at sea are concerned) and thus do not influence the weight of the wind turbine either.

Figure 6:
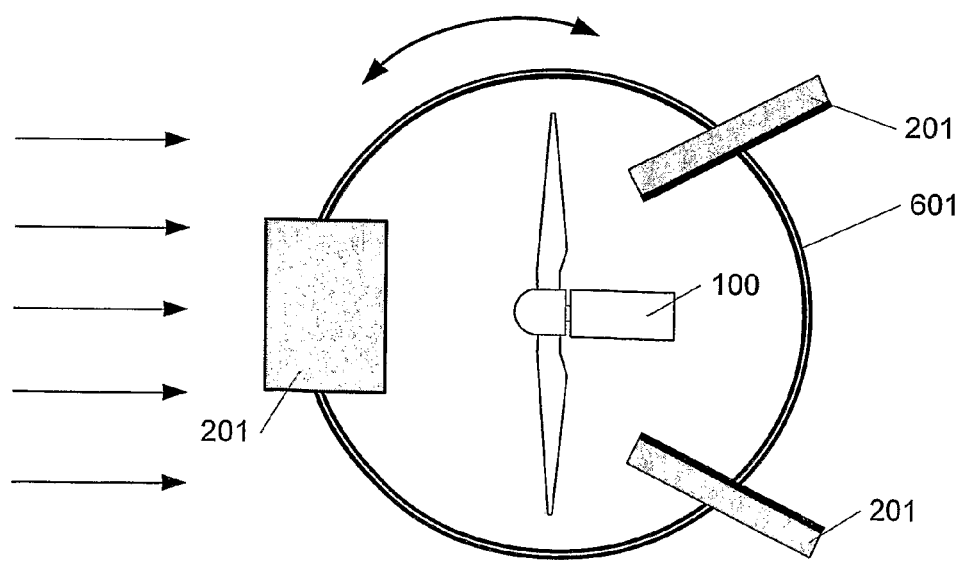
FIG. 6 shows a wind turbine seen from above, with flow surfaces that are able to rotate about the turbine.

FIG. 6 shows a wind turbine 100, seen from above, with an embodiment of the invention wherein a number of flow surfaces 201 are arranged on a rail 601 extending around the wind turbine. Hereby it is accomplished that the shields 201 can be rotated about the wind turbine and thus be adjusted optimally relative to the direction of the wind and the orientation of the wind turbine. The system of the air deflection shields can, according to one embodiment, comprise a wind direction meter based on which the shields are adjusted relative to the turbine. The control of the shields can thus take place completely independently of the control of the wind turbine, which considerably simplifies placement of the flow surfaces and considerably reduces the costs of the system.

If the flow surfaces are to be established in connection with wind turbines at sea, this can be done in a manner corresponding to the above, with the mere modification that the shields are arranged eg on a system of pontoons or the like that are secured to the tower of the wind mill at sea, either to the effect that they are fixedly positioned optimally relative to the dominant wind direction or such that they can be rotated about the tower and follow the direction of the wind. Alternatively the shields could be mounted on ships riding at anchor or in connection with proximally placed wave energy plants.

Figure 7:
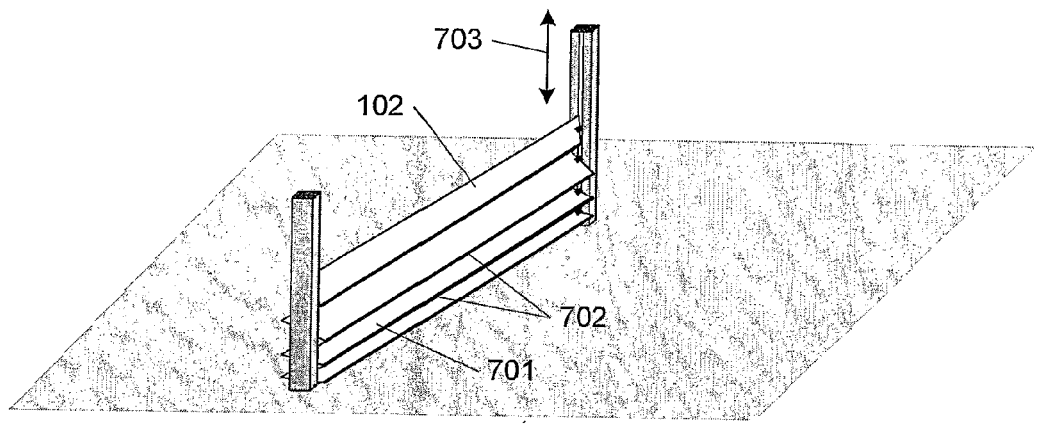
FIGS. 7-8 show different embodiments of flow surfaces according to the invention.
Figure 8:
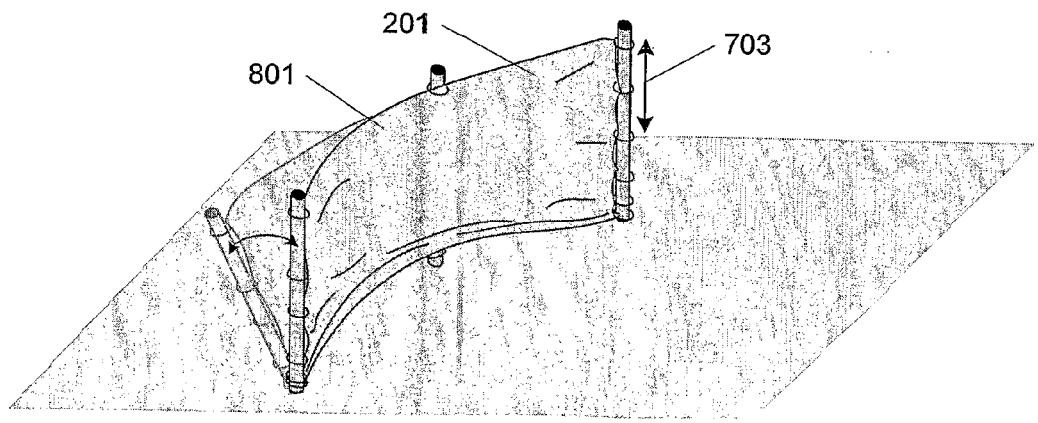

FIGS. 7-8 show different embodiments of flow surfaces or air deflection shields 201 according to the invention. FIG. 7 outlines a flow surface 201 made of plate segments 701 combined in articulations 702. Thus the shield can be folded as shown by arrow 703 and thereby be taken out of the wind, as is advantageous in case of elevated wind speeds. The folding may be controlled eg by means of an electro-motor. In this as well as in the foregoing embodiments, the flow surfaces may advantageously be made of a composite plastics material, such as glass or carbon fibre material. Alternatively the shields may be made of a metal material or wood.

According to a further embodiment shown in FIG. 8, the flow surfaces 201 are made of canvas material 801, and in that case the faces are expanded between two or more posts or poles 802. Here, flow surfaces 201 may be set and swept in a manner similar to that of sails on a ship. The setting of the faces can be regulated further by mounting of the post 802 such that they can be tilted eg by means of hydraulics or an electro-motor.

Figure 9:
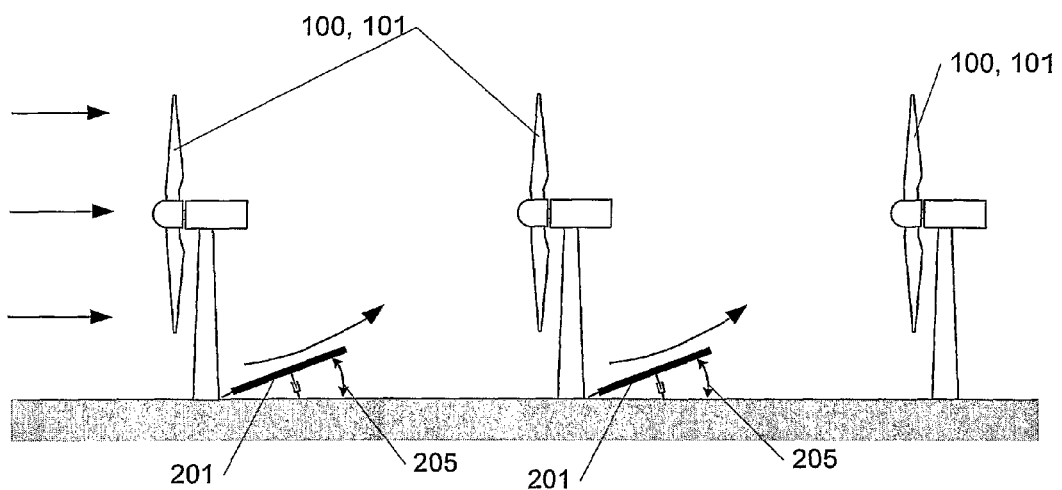
FIG. 9 shows an alternative location of a flow surface, wherein several wind turbines are arranged as a group.

FIG. 9 shows a further embodiment of the invention, wherein one or more flow surfaces 201 are used to increase the power uptake and operating efficiency of a group of wind turbines 100. The efficiency of a rotor 101 drops when it is in the wake of another rotor. The operating efficiency of a wind turbine at sea (given by the total production of the farm divided by the number of mills and divided by the output of a single turbine if it were on its own) depends strongly on the direction of the wind, the operating efficiency decreasing when the wind blows in parallel with the rows of turbines. One example of this is the wind farm Horns Rev which has an overall operating efficiency of 90.5%, but whose operating efficiency drops to 65% in case of given wind directions. The natural thermal current (vertically moving flows of air) caused by differences in temperature between the air and the water may increase the farm operating efficiency by about 5% (from 65% to 70%) due to the wake of one wind turbine being destroyed since a larger degree of washing out of the vortices in the wake occurs simultaneously with an acceleration of the wind, where the wind is conveyed upwards to the next rotor. Due to placement of one flow surface 201 behind one rotor 101, as illustrated in FIG. 9, wind blowing underneath the rotor 101 is conveyed upwards into the wake of the wind turbine, and an artificial thermal current is produced which thereby washes out the vortices, guides the wind up to the next rotor 901 and increases its performance. For instance, the flow surface 201 can be mounted on the foundation or the lower most part of the tower and can be tilted horizontally in case of high wind speeds as shown by arrows 205. The largest effect of such placement of a flow surface at a wind turbine located in front is accomplished with offshore wind farms at sea, where the wind flow is more laminar than is the case ashore.

It will be understood that the invention as taught in the present description and figures can be modified or changed while continuing to be comprised by the protective scope conferred by the following claims.

The invention claimed is:

1. A method of increasing the output of a horizontal axis, upwind wind turbine (101) having a three blade rotor rotating in a direction perpendicular to a wind direction, said method comprising placement of at least one flow surface (202) characterized in that the flow surface (202) is, at lower wind speeds, adjusted to create a venturi effect by guiding the wind in towards and/or out from the rotor of the wind turbine, and such that the flow surface is, at higher wind speeds, at least partially taken out of the flow of the wind by laying down the flow surface along the ground.

2. A method of increasing the output of a wind turbine according to claim 1, characterized in that the at least one flow surface is placed at a second wind turbine (100) to influence the wind flow to the second wind turbine being located in front of the first one.

3. A method of increasing the output of a wind turbine according to claim 1, characterized in that the at least one flow surface is at least partially taken out of the flow of the wind by laying down the flow surface along the ground.

4. A method of increasing the output of a wind turbine according claim 1, characterized in further comprising to measure the direction of the wind and to place the at least one flow surface relative to the wind turbine as a function of the direction of the wind.

5. A method of increasing the output of a wind turbine according to claim 1, characterized in further comprising to measure the speed of the wind and to set the at least one flow surface as a function thereof.

6. A method of increasing the output of a wind turbine according to claim 1, characterized in further comprising to receive a power signal from the wind turbine and to set the at least one flow surface as a function thereof.

7. A system of increasing the output of a horizontal axis, upwind wind turbine (101) having a three blade rotor rotating in a direction perpendicular to a wind direction, said system comprising at least one flow surface (202) placed such that, at lower wind speeds, the flow surface creates a venturi effect by guiding the wind in towards and/or out from the rotor of the wind turbine; and said system further comprising means (204) for setting the flow surface such that, at higher wind speeds, the flow surface is at least partially taken out of the flow, characterized in that the at least one flow surface is mounted on or at the ground and/or the water surface and is of a height corresponding to the distance there from to the lowermost part of the rotor of the wind turbine or less.

8. A system according to claim 7, characterized in that the at least one flow surface is placed by a second wind turbine to influence the wind flow to the second wind turbine being located in front of the first one.

9. A system according to claim 7, characterized in that the means for setting the at least one flow surface comprises at least one hydraulic motor or electro-motor.

10. A system according to claim 7, characterized in further comprising a wind speed indicator.

11. A system according to claim 7, characterized in further comprising a wind direction meter.

12. A system according to claim 7, characterized that the at least one flow surface is mounted rotatable about the wind turbine, eg by being mounted on rails, pontoons or ships.

13. A system according to claim 7, characterized in that the at least one flow surface is made of a composite plastics material, such as eg glass fibre or carbon fibre.

14. A system according to claim 7, characterized in that the at least one flow surface is made of canvas.

15. A system according to claim 7, characterized in that the system is coupled to the control system of the wind turbine for receiving signals for setting of the at least one flow surface.

* * * * *